US008540561B2

(12) United States Patent
Carbonaro et al.

(10) Patent No.: US 8,540,561 B2
(45) Date of Patent: Sep. 24, 2013

(54) GAMING SYSTEM AND METHOD

(76) Inventors: Michael Vincent Carbonaro, Tumbi Umbi (AU); Mark Steven Carbonaro, Glenning Vale (AU)

( * ) Notice: Subject to any disclaimer, the term of this patent is extended or adjusted under 35 U.S.C. 154(b) by 0 days.

(21) Appl. No.: 13/046,968

(22) Filed: Mar. 14, 2011

(65) Prior Publication Data

US 2011/0269518 A1 Nov. 3, 2011

(30) Foreign Application Priority Data

Apr. 29, 2010 (AU) ................................ 2010901814

(51) Int. Cl.
*G06F 17/00* (2006.01)

(52) U.S. Cl.
USPC ............................................................ 463/9

(58) Field of Classification Search
USPC ..................................... 463/9–11, 16, 20, 25
See application file for complete search history.

(56) References Cited

U.S. PATENT DOCUMENTS

| | | | | |
|---|---|---|---|---|
| 5,643,084 | A * | 7/1997 | Mirsky | 463/9 |
| 6,015,346 | A | 1/2000 | Bennett | |
| 6,264,198 | B1 * | 7/2001 | Stamper | 273/157 R |
| 6,388,688 | B1 * | 5/2002 | Schileru-Key | 715/854 |
| 6,428,412 | B1 | 8/2002 | Anderson et al. | |
| 6,964,608 | B1 | 11/2005 | Koza | |
| 7,314,409 | B2 | 1/2008 | Maya et al. | |
| 7,892,095 | B2 * | 2/2011 | Caffrey | 463/31 |
| 2005/0056999 | A1 | 3/2005 | Roemer et al. | |
| 2005/0059460 | A1 | 3/2005 | Breen et al. | |
| 2006/0281528 | A1 | 12/2006 | Hall et al. | |
| 2009/0011811 | A1 * | 1/2009 | Ducharme et al. | 463/13 |
| 2009/0011825 | A1 | 1/2009 | Lima et al. | |
| 2009/0258687 | A1 | 10/2009 | Weichselbaum | |

* cited by examiner

*Primary Examiner* — Ronald Laneau
(74) *Attorney, Agent, or Firm* — Fay Sharpe LLP

(57) ABSTRACT

A computer-implemented method for gaming. The method comprising displaying a plurality of puzzle pieces on a display screen of a gaming machine, the plurality of puzzle pieces being associated with a jigsaw puzzle, receiving a player's selection of one of the plurality of puzzle pieces via the display screen, determining a prize associated with the selected puzzle piece; and displaying an animation of the selected puzzle piece and the determined prize on the display screen. This disclosure also includes an update gaming machine and a game controller to implement the method.

8 Claims, 5 Drawing Sheets

(a)

(b)

GAMING SYSTEM AND METHOD

TECHNICAL FIELD

This description generally concerns gaming, and in particular, a computer-implemented method for gaming. In other aspects, there are provided a game controller and a gaming machine operable to implement the method for gaming.

BACKGROUND

Gaming machines are popular in the gaming industry and can be programmed to playa variety of games such as slot and keno. In order attract more players, gaming machine manufacturers and operators often produce new games, or enhance existing ones.

SUMMARY

According to a first aspect, here is provided a computer-implemented method for gaming, comprising:

(a) displaying a plurality of puzzle pieces on a display screen of a gaming machine, the plurality of puzzle pieces being associated with a jigsaw puzzle;

(b) receiving a player's selection of one of the plurality of puzzle pieces via the display screen;

(c) determining a prize associated with the selected puzzle piece; and (d) animating the selected puzzle piece and displaying the determined prize on the display screen.

Step (b) may comprise detecting a touching action by the player on an area on the display screen, the area displaying at least part of the selected puzzle piece.

The plurality of puzzle pieces may be related to a geographical location. The geographical location may be predetermined according to the actual location of the gaming machine.

Step (a) may be performed when triggered by one of the following:

a number generated randomly or according to a probability distribution number of base games played; and an outcome of a base game played on the gaming machine.

The animation may be zooming in, rotation and/or flipping of the selected puzzle piece.

The method may further comprise removing the selected puzzle piece from the display screen after step (d).

The method may further comprise adding the removed puzzle piece to a partially completed jigsaw puzzle on a second display screen connected to a plurality of gaming machines.

According to a second aspect, there is provide a gaming machine operable to implement the method of the first aspect.

According to a third aspect, there is provide a game controller operable to implement the method of the first aspect, the game controller being operable to communicate with one or more gaming machines over a communications network.

BRIEF DESCRIPTION OF DRAWINGS

Non-limiting example(s) of the invention will now be described with reference to the accompanying drawings, in which:

FIG. 5(*b*) is an exemplary screen shot of a display device displaying a prize associated with a selected puzzle piece.

DETAILED DESCRIPTION

Figure 1:
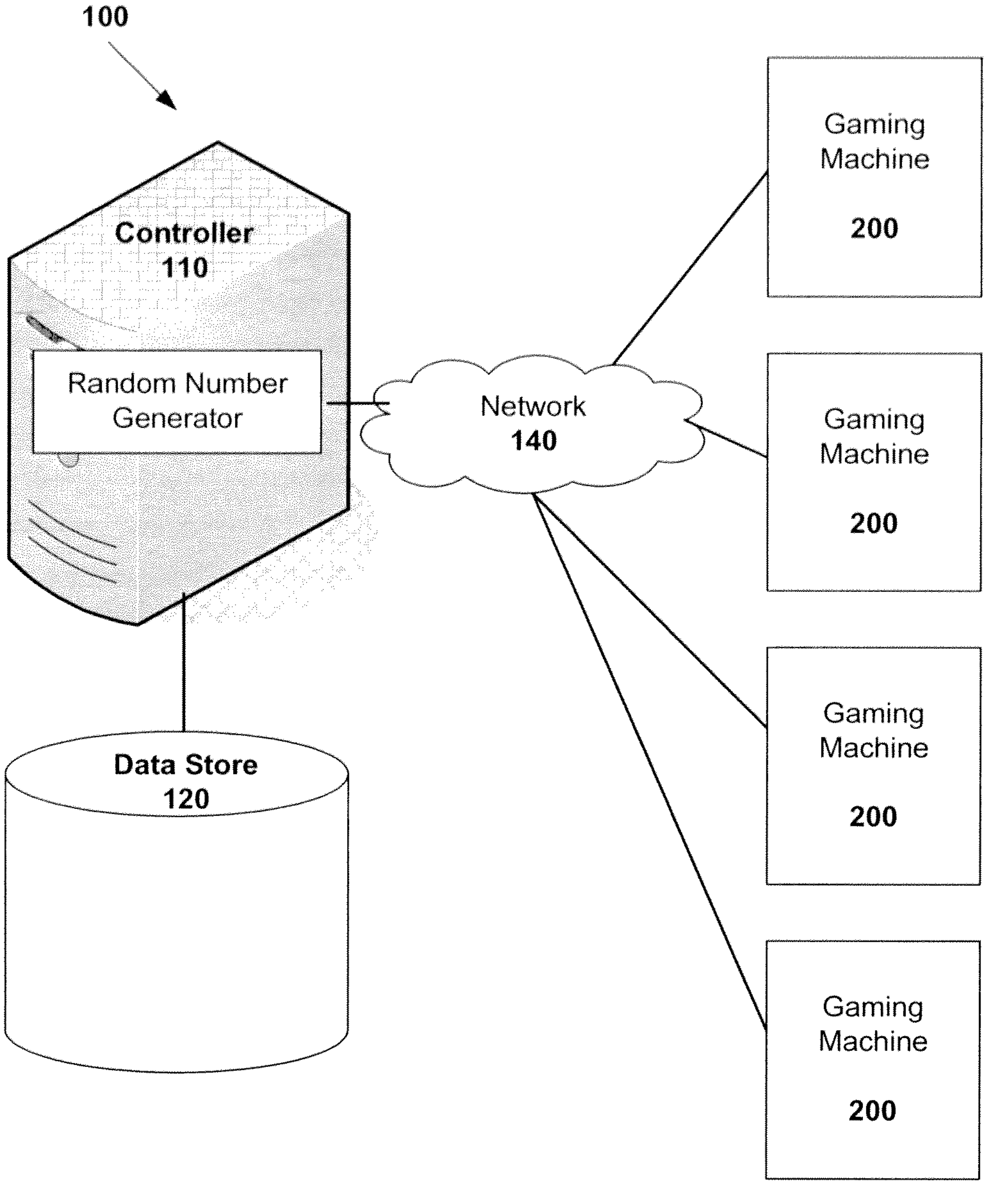
FIG. 1 is a schematic diagram of an exemplary gaming system.

Referring first to FIG. 1, the gaming system 100 comprises a game controller 110 in communication with a plurality of gaming machines 200 via a communications network 140. If the controller 110 is located at a gaming venue, a local area network (LAN) 140 can be used. Otherwise, a wide area network (WAN) 140 such as the Internet can be used if the controller 110 is located at a remote location.

Figure 2:
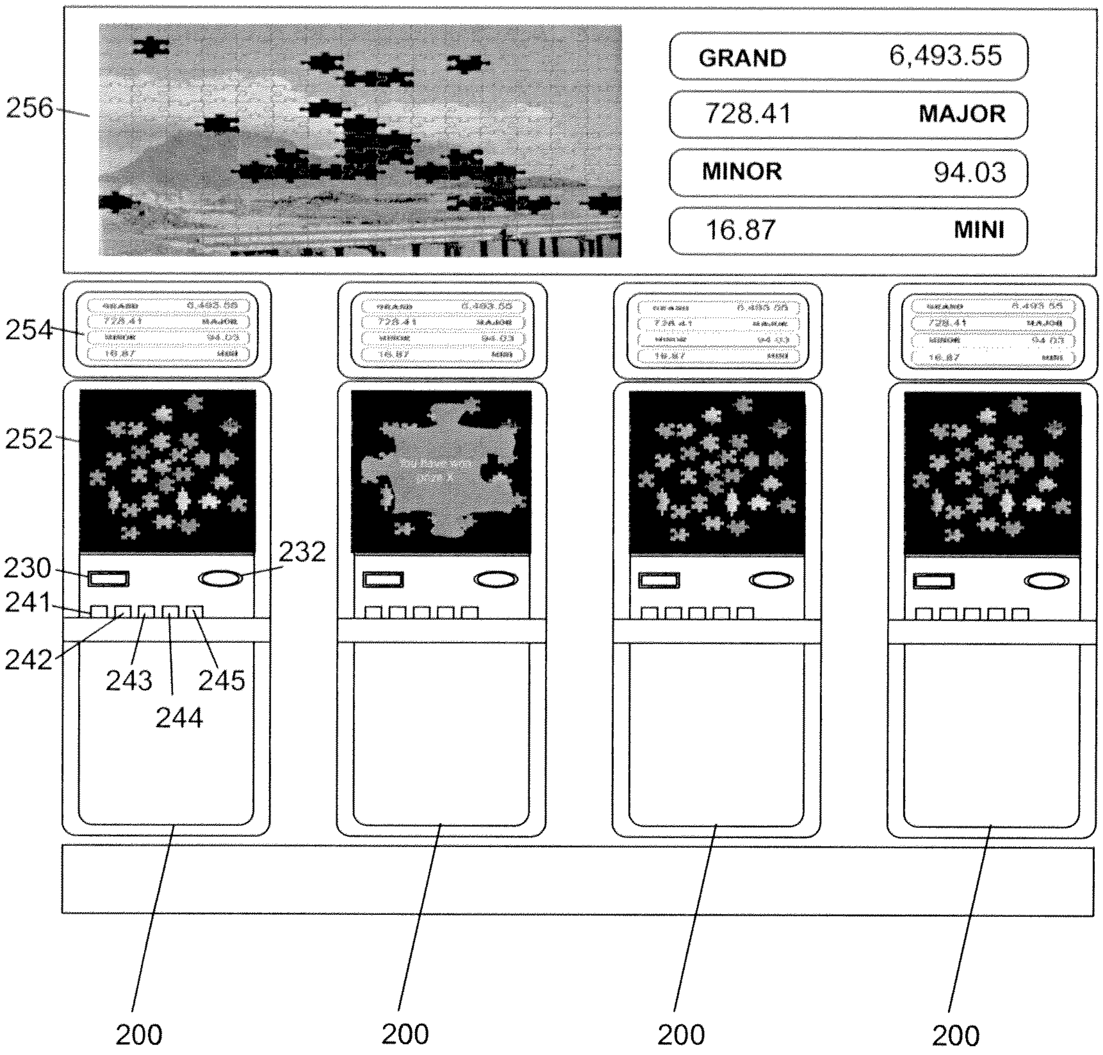
FIG. 2 is a pictorial front view of a group of gaming machines that are connected to a game controller.
Figure 3:
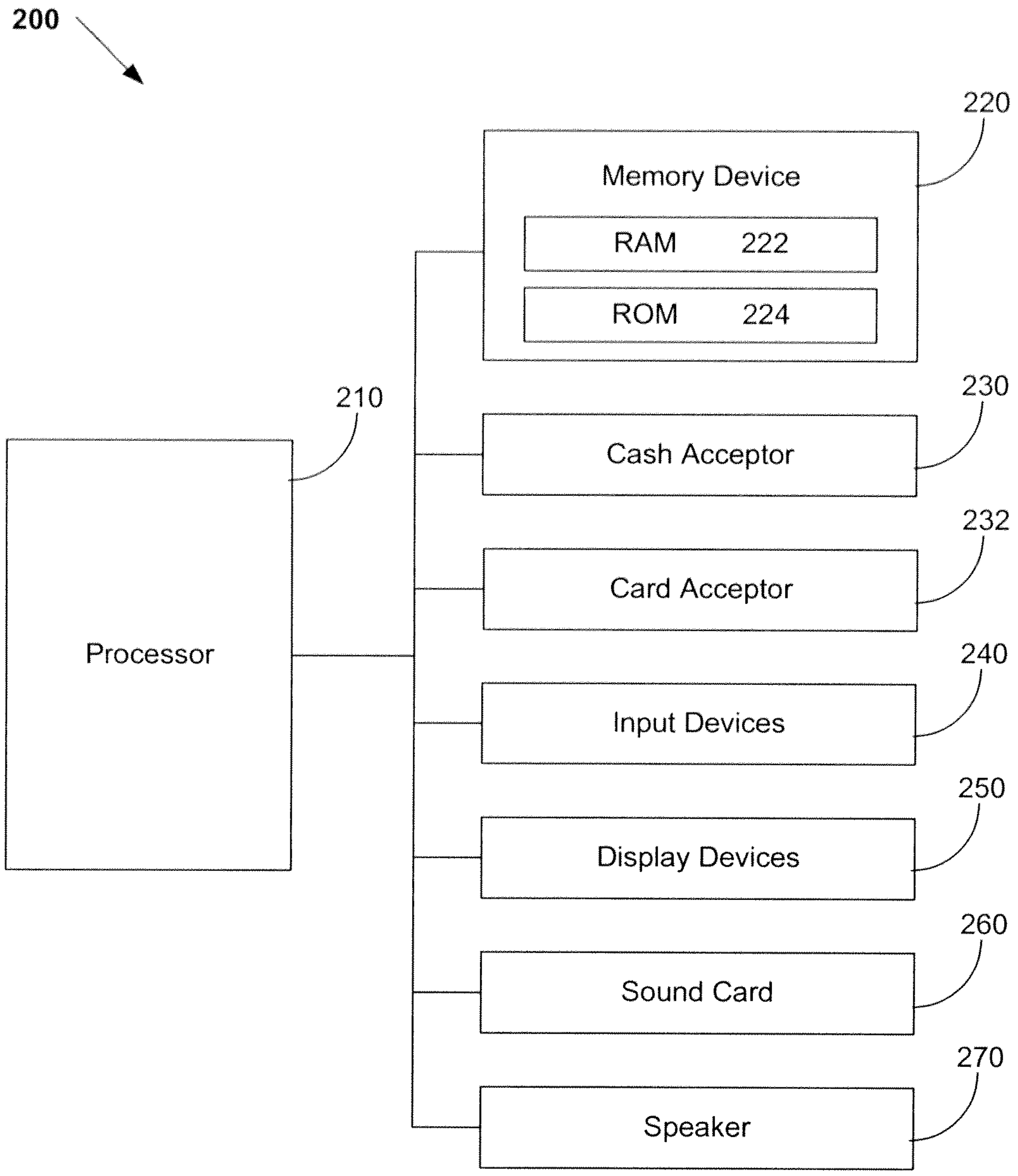
FIG. 3 is a schematic block diagram of hardware components of a gaming machine in FIG. 2.

Referring also to FIG. 2 and FIG. 3, the game controller 110 is operable to implement a gaming method on a plurality of gaming machines 200 that are linked or grouped together. The gaming machines 200 linked to the game controller 110 may be of the same model or different ones. The game controller 110 is operable to access and store data in the data store.

The hardware components of a gaming machine 200 is shown in FIG. 3. Each gaming machine 200 comprises an onboard processor 210 that is connected to the following.

A memory device 220 having random access memory (RAM) 222 to store data generated during a game and read only memory (ROM) to store program code.

A cash acceptor 230 to receive cash from a player in order to play a game.

A card acceptor 232 to receive a smart card, credit card or debit card having a certain amount of money stored on the card in order to play a game.

Input devices 240 including a play button 241, abet one credit button 242, a maximum bet button 243, a cash out button 244, and a hold or cancel button 245 (see FIG. 2).

Display devices 250 including an upper display screen 254, a lower display touch screen 252 and a shared display screen 256 which is also linked to multiple other gaming machines 200. And, A sound card 260 connected to some speakers 270 to output sound signals during a game to enhance player experience.

In a "slim client" architecture, the gaming machines 200 do not require much processing capability because games being played on the machines 200 are controlled and executed remotely by the game controller 110. Otherwise, in a "fat client" architecture, part of the game is executed by the gaming machine 200 while another part is executed by the game controller 110. As such, it should be understood that although steps of the method in FIG. 4 are described to be performed by the controller 110 in one embodiment, some or all of the steps may also be performed by the onboard processor 210 of a gaming machine 200 in other embodiments.

To enhance the level of entertainment provided by the gaming machines 200, there are two types of game that can be played by a player: base game and bonus game. The base game may be slot, blackjack, keno, pokier or the like. In addition to winning credits by playing the base game, the bonus game provides the player with opportunity to win additional prizes.

Figure 4:
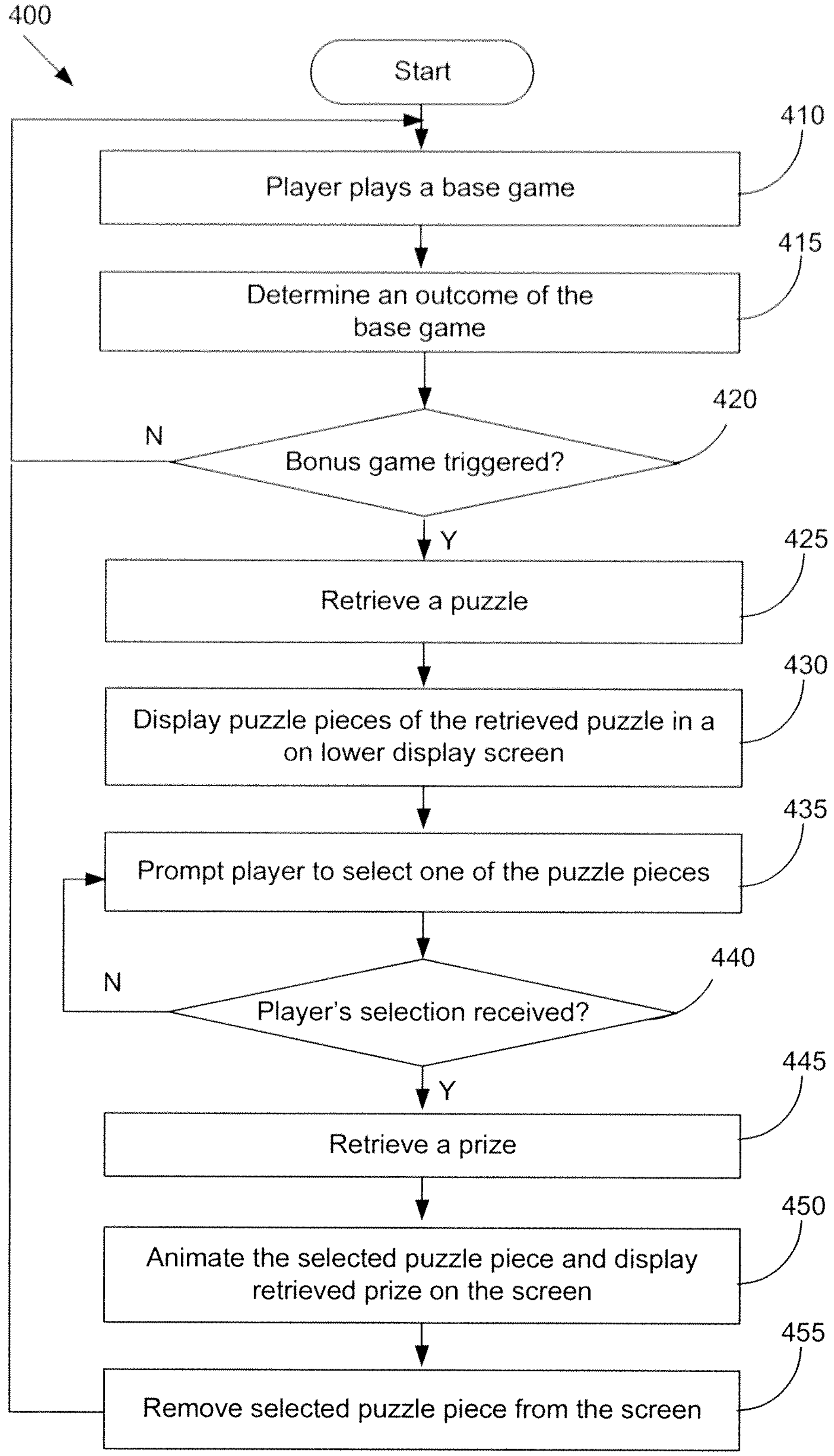
FIG. 4 is a flowchart of steps of an exemplary method for gaming.

A player plays abuse game by making a wager and pressing the play button 241; step 410 in FIG. 4. Wager can be performed by depositing cash or inserting a card into the cash 230 or card 235 acceptor respectively. The controller 110 then determines an outcome of the game, that is whether the player has won any credits and how many; see step 415. For example in a slot machine game, the value of credits won may be either Grand, Major, Minor or Mini which are shown in FIG. 2 in decreasing value.

The bonus game can be triggered by the controller 110 at any time, such as in between base games; see step 420. The bonus game may be triggered based on one or more of the following:

The outcome of the base game, such as whether the Grand, Major, Minor and Mini jackpots are won by the player, or whether the number of credits won is above or below a predetermined threshold. The outcome of the game may also be a specific combination of symbols on a pay line of the gaming machine 200.

A number between 0 and 1 generated according to a probability distribution. The bonus game is triggered if the generated number is more than a predetermined threshold such as 0.3.

A random number between 0 and 1 that is generated by a random number generator at the controller 110. The bonus game is triggered if the random number is more than a predetermined threshold such as 0.3.

Number of base games played since the last bonus game. The number may be predetermined or random within a predetermined range, such as between 50 to 150 games. Increasing stake rate will could increase the probability of the bonus being triggered. For example, with a higher stake the bonus may be triggered between 20-50 games.

Figure 5:
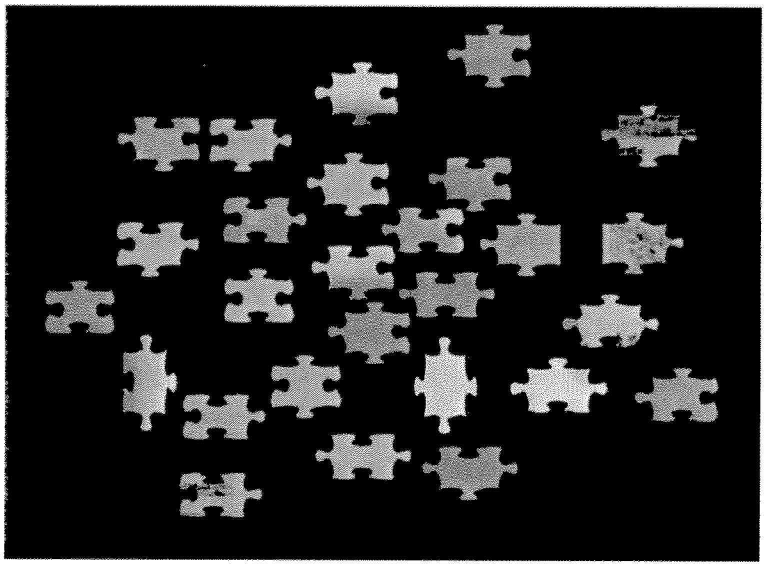
FIG. 5(*a*) is an exemplary screen shot of a display device displaying a plurality of puzzle pieces.
Figure 5:

If the bonus game is triggered, the controller 110 retrieves a puzzle from the data store 120 and displays puzzle pieces of the retrieved puzzle on the lower display screen 252; see steps 425 and 430. In the example shown in FIG. 5, the puzzle is a jigsaw puzzle.

The jigsaw puzzle retrieved by the controller 110 is related to the geographical location of the gaming machine 200. For example, if the gaming machine 200 is located in Australia, a jigsaw puzzle of the Sydney Opera House or Harbour Bridge will be retrieved and displayed. Alternatively, the jigsaw puzzle retrieved by the controller 110 is predetermined by a venue operator. For example, a gaining machine 200 in Sydney may be themed around French scenery to match the decor of the venue.

While the bonus game is being played, the controller 110 also plays a theme video or slide show related to the geographical location on a shared display screen 256 linked to the gaming machines 200; see FIG. 2. In addition, Australia-related sound or music is played on the speakers 270 to further enhance player's experience.

Referring to FIG. 2 again, a partially completed jigsaw puzzle is displayed on the shared display screen 256. The remaining puzzle pieces that are missing from the shared display screen 256 are displayed on the lower display screen 252. As shown more clearly in FIG. 5(*a*), the puzzle pieces are displayed in a scrambled manner, where some pieces are displayed in an incorrect orientation.

The controller 110 then prompts the player to select one of the puzzle pieces; see step 435. This may involve displaying an text-based instruction on the lower display screen 252 or outputting an audio-based instruction on the speakers 270.

The controller 110 then receives the player's selection of one of the puzzle pieces via the lower display screen 252; see step 440. The player's selection is received by detecting a touching action by the player on an area on the lower display screen 252, the area displaying at least part of the selected puzzle piece.

When a puzzle piece is selected, the controller 110 determines a prize that is associated with the selected puzzle piece; see step 445. The prize may be one or more of the following:

Free spins: The player will receive a set number of free base games as a prize.

Bonus pay: The player will receive a set number of credits as a prize. The prize level may be Grand, Major, Minor or Mini.

Multiply your pay: The player will receive a payment multiplication factor, such as 2 or more times for a specific number of subsequent base games as a prize. And, Second chance: The player will receive another chance at selecting a puzzle piece.

The controller 110 then displays an animation of the selected puzzle piece and the prize associated with the selected puzzle piece on the lower display screen 252; see step 450. In one example, the animation involves zooming in, rotation and flipping of the selected puzzle piece before displaying the prize. The animation is generally stored on the data store 120 or in the ROM 224 of the gaming machine 200.

Every time a puzzle piece is selected by a player using the lower display screen 252, the controller 110 marks the selected puzzle piece as "played" and records this information in the data store 120 or the RAM 222 of the gaming machine 200. The controller 110 then removes the selected puzzle piece from the lower display screen 252 and adds it to the partially completed puzzle on the shared display screen 256 above the gaming machine 200.

When the bonus game is triggered again in step 420, puzzle pieces that have not been selected by the player in previous rounds of the bonus game will be displayed for selection by the player in step 425. However, once all puzzle pieces have been selected and removed from the lower display screen 252, the controller 110 will retrieve a new puzzle in the next round.

It will be appreciated by persons skilled in the art that numerous variations and/or modifications may be made to the invention as shown in the specific embodiments without departing from the scope of the invention as broadly described. The present embodiments are, therefore, to be considered in all respects as illustrative and not restrictive.

For example, the bonus puzzle game can be added to any existing base game. Apart from pokies, keno, blackjack and poker, the base game may be Queen of the Nile, Dolphin Treasure, Indian Dreaming, White Tiger, Black Rhino and KG Bird. The bonus game may also be played on the gaming machine 200 as a "theme" or secondary feature.

In the linked configuration shown in FIG. 2, the puzzle may be played by multiple players. In this case, if a puzzle piece is selected by one of the players, the same puzzle piece will be removed from the lower display screen 252 of all the linked gaming machine 200. This configuration further creates excitement for players, as they race to complete the puzzle. The player who selects most or last puzzle piece is awarded a major prize.

While the gaming machines 200 are shown to be linked in FIG. 1 and FIG. 2, an embodiment where the machines 200 are standalone machines are also envisaged. In this case, the game controller 110 is not required and the processor 210 of the standalone gaming machine implements the gaming method shown in FIG. 4.

It should also be understood that, unless specifically stated otherwise as apparent from the following discussion, it is appreciated that throughout the description, discussions utilizing terms such as "receiving", "processing", "retrieving", "selecting", "calculating", "determining", "displaying" or the like, refer to the action and processes of a computer system, or similar electronic computing device, that processes and transforms data represented as physical (electronic) quantities within the computer system's registers and memories into other data similarly represented as physical quantities within the computer system memories or registers or other such information storage, transmission or display devices. Unless the context clearly requires otherwise, words using singular or plural number also include the plural or singular number respectively.

It should also be understood that the techniques described might be implemented using a variety of technologies. For example, the methods described herein may be implemented by a series of computer executable instructions residing on a suitable computer readable medium. Suitable computer readable media may include volatile (e.g. RAM) and/or non-volatile (e.g. ROM, disk) memory, carrier waves and transmission media (e.g. copper wire, coaxial cable, fibre optic media). Exemplary carrier waves may take the form of electrical, electromagnetic or optical signals conveying digital data steams along a local network or a publically accessible network such as the Internet.

The invention claimed is:

1. A computer-implemented method for gaming on a slot machine, the method comprising:

(a) when a bonus game is triggered, the slot machine displaying a plurality of jigsaw puzzle pieces on a display screen of the slot machine, the plurality of jigsaw puzzle pieces being associated with a jigsaw puzzle;

(b) the slot machine receiving a player's selection of one of the plurality of jigsaw puzzle pieces via the display screen;

(c) in response to the player's selection, the slot machine determining a prize associated with the selected jigsaw puzzle piece; and (d) after the prize is determined and without receiving a further player's selection, the slot machine:

animating the selected jigsaw puzzle piece, displaying the determined prize associated with the selected jigsaw puzzle piece on the display screen; and then removing the selected jigsaw puzzle piece from the display screen such that when another bonus game is triggered, jigsaw puzzle pieces that have not been selected by the player are displayed for the player's selection.

2. The computer-implemented method of claim 1, wherein step (b) comprises the slot machine detecting a touching action by the player on an area on the display screen, the area displaying at least part of the selected jigsaw puzzle piece.

3. The computer-implemented method of claim 1, wherein the plurality of jigsaw puzzle pieces are related to a geographical location of the slot machine.

4. The computer-implemented method of claim 1, wherein the bonus same is triggered in step (a) by one of the following:

a number generated randomly or according to a probability distribution number of base games played on the slot machine; and an outcome of a base game played on the slot machine.

5. The computer-implemented method of claim 1, further comprising the slot machine adding the removed jigsaw puzzle piece to a partially completed jigsaw puzzle on a second display screen connected to the slot machine and at least one other slot machine.

6. The computer-implemented method of claim 1, wherein the slot machine animating the selected jigsaw puzzle piece involves zooming in, rotating and flipping of the selected jigsaw puzzle piece before displaying the determined prize on the display screen.

7. A slot machine comprising a display screen and a processor to (a) when a bonus game is triggered, display a plurality of jigsaw puzzle pieces on a display screen of the slot machine, the plurality of jigsaw puzzle pieces being associated with a jigsaw puzzle;

(b) receive a player's selection of one of the plurality of jigsaw puzzle pieces via the display screen;

(c) in response to the player's selection, determine a prize associated with the selected jigsaw puzzle piece; and (d) after the prize is determined and without receiving a further player's selection:

animate the selected jigsaw puzzle piece, display the determined prize associated with the selected jigsaw puzzle piece on the display screen; and then remove the selected jigsaw puzzle piece from the display screen such that when another bonus game is triggered, jigsaw puzzle pieces that have not been selected by the player are displayed for the player's selection.

8. A game controller operable to implement the method of claim 1, the game controller being operable to communicate with one or more slot machines over a communications network.

* * * * *